US007995130B2

(12) United States Patent
Ishibashi et al.

(10) Patent No.: US 7,995,130 B2
(45) Date of Patent: Aug. 9, 2011

(54) IMAGE-RECORDING DEVICE

(75) Inventors: Koichi Ishibashi, Tokyo (JP); Naoki Yamagata, Saitama (JP)

(73) Assignee: Hoya Corporation, Tokyo (JP)

( * ) Notice: Subject to any disclaimer, the term of this patent is extended or adjusted under 35 U.S.C. 154(b) by 1055 days.

(21) Appl. No.: 11/420,871

(22) Filed: May 30, 2006

(65) Prior Publication Data

US 2006/0268126 A1 Nov. 30, 2006

(30) Foreign Application Priority Data

May 31, 2005 (JP) ................................ P2005-158978

(51) Int. Cl.
*H04N 5/222* (2006.01)
*H04N 5/76* (2006.01)
*H04N 5/77* (2006.01)
*G06F 3/048* (2006.01)

(52) U.S. Cl. ............. 348/333.02; 348/231.2; 348/231.8; 386/225; 715/781

(58) Field of Classification Search ................ 348/231.2, 348/231.3, 231.5–231.8, 333.02, 333.05, 348/333.11, 333.12; 386/210, 230, 224–226; 715/730, 838, 781

See application file for complete search history.

(56) References Cited

U.S. PATENT DOCUMENTS

| | | | | |
|---|---|---|---|---|
| 6,335,742 B1 * | 1/2002 | Takemoto | ................ | 715/781 |
| 6,879,342 B1 * | 4/2005 | Miller et al. | ............. | 348/333.05 |
| 7,092,012 B2 * | 8/2006 | Nakamura et al. | ......... | 348/211.3 |
| 7,106,375 B2 * | 9/2006 | Venturino et al. | ........ | 348/333.02 |
| 7,369,164 B2 * | 5/2008 | Parulski et al. | ........... | 348/231.99 |
| 7,633,534 B2 * | 12/2009 | Misawa et al. | ............. | 348/231.2 |
| 7,779,358 B1 * | 8/2010 | Gupta et al. | ................. | 715/730 |
| 7,823,084 B2 * | 10/2010 | Ishizuka | ........................ | 715/838 |
| 7,924,326 B2 * | 4/2011 | Kojima | ....................... | 348/231.6 |
| 2001/0004268 A1 * | 6/2001 | Kubo et al. | ............... | 348/333.02 |
| 2004/0179115 A1 * | 9/2004 | Tomat et al. | ............... | 348/231.6 |
| 2005/0157186 A1 * | 7/2005 | Tsuji et al. | ................. | 348/231.3 |
| 2008/0018773 A1 * | 1/2008 | Nozawa | .................... | 348/333.05 |

FOREIGN PATENT DOCUMENTS

| | | |
|---|---|---|
| JP | 2003-264776 | 9/2003 |
| JP | 2004-78283 | 3/2004 |
| JP | 2004-201226 | 7/2004 |

OTHER PUBLICATIONS

English language abstract of JP 2004-201226.
U.S. Appl. No. 11/422,102 to Ishibashi et al., filed Jun. 5, 2006.

* cited by examiner

*Primary Examiner* — David Ometz
*Assistant Examiner* — Carramah J Quiett
(74) *Attorney, Agent, or Firm* — Greenblum & Bernstein, P.L.C.

(57) ABSTRACT

An image-recording device comprises a recording processor recording a common still image, to which an identical frame number (a folder-number/file-number pair, for example) is attached, on a plurality of recording media, respectively. A plurality of images, to which an identical frame number is attached, are simultaneously indicated on the screen of a monitor. A candidate image is selected, which should be subjected to a predetermined image process such as deletion operation, from the plurality of images indicated on the screen.

19 Claims, 13 Drawing Sheets

| FOLDER-NUMBER<br>FILE-NUMBER | | 100<br>0001 |
|---|---|---|
| SD | RAW<br>JPEG | SCENE A<br>SCENE A |
| CF | RAW<br>JPEG | SCENE B<br>SCENE B |

US 7,995,130 B2

IMAGE-RECORDING DEVICE

BACKGROUND OF THE INVENTION

1. Field of the Invention

The present invention relates to an image-recording device, which can simultaneously record a common still image in a plurality of recording media, for example.

2. Description of the Related Art

Conventionally, a digital camera has been proposed, on which two recording media, such as a CF card and an SD card, can be detachably mounted. The two recording media are used mainly for backup, so that one still image, obtained by a photographing operation, is simultaneously recorded on each of the recording media. These recording media can be separately used. For example, it is possible for only one recording medium to be mounted on a personal computer to perform an image process on an image. Further, the same recording media are not always used simultaneously. For example, two recording media, which have been separately used, may be mounted on a single digital camera.

In a conventional digital camera, when two recording media are mounted, an operation such as deletion can be carried out for images having a common folder-number/file-number pair. Namely, in two images, if their folder-number/file-number pairs are identical, it is deemed that the two images were recorded at the same time. In reality, however, when recording media, which were used in different digital cameras, are simultaneously used, it may happen that the folder-number/file-number pairs are identical, but the images are different, a situation which cannot be recognized before the operation.

SUMMARY OF THE INVENTION

Therefore, an object of the present invention is to provide an image-recording device, in which the contents of images, recorded in a plurality of recording media, can be confirmed before performing an image process on the images, so that the execution of an erroneous image process is prevented.

According to the present invention, there is provided a first image-recording device comprising a recording processor, a monitor, an image-indicating processor, and an image selecting processor.

The recording processor records a common still image, to which an identical frame number or identical frame name is attached, on a plurality of recording media, respectively, which are detachably mounted on the image-recording device. The monitor displays a still image on a screen thereof. The image-indicating processor simultaneously displays a plurality of images, which are read from the plurality of recording media, and to which an identical frame number or identical frame name is attached, on the screen. The image-selecting processor selects a candidate image, which is to be subjected to a predetermined image process, from the plurality of images indicated by the image-indicating processor.

Further, according to the present invention, there is provided a second image-recording device comprising a recording processor that records a common still image in an internal memory and a recording medium, respectively, a monitor, an image-indicating processor, and an image-selecting processor. The image-indicating processor simultaneously displays a plurality of images, which are read from the internal memory and the recording medium, on the screen of the monitor.

Furthermore, according to the present invention, there is provided a third image-recording device comprising a recording processor that records a common still image in a plurality of recording areas provided in an internal memory. The image-indicating processor simultaneously displays a plurality of images, which are read from the plurality of recording areas, on the screen of the monitor.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
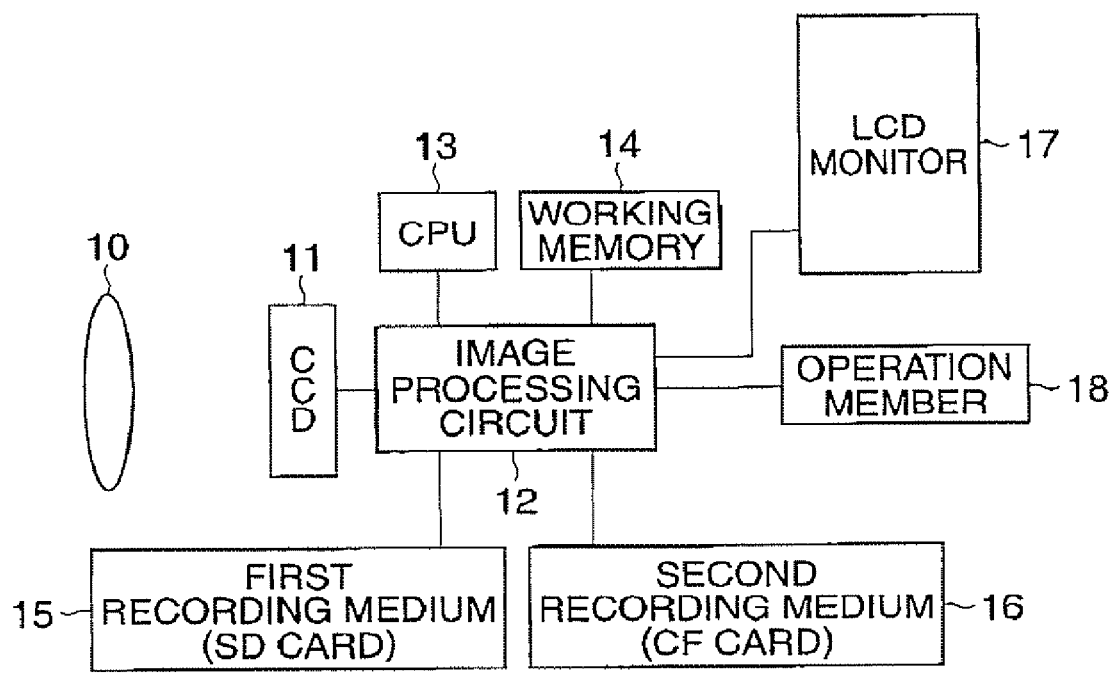
FIG. 1 is a block diagram showing a general construction of a digital camera, to which an image-recording device of an embodiment of the present invention is applied.

The present invention will be described below with reference to the embodiments shown in the drawings.

FIG. 1 is a block diagram showing a general construction of a digital camera, to which an image-recording device of an embodiment of the present invention is applied.

An imaging device 11, provided on the optical axis of the photographing optical system 10, can be a CCD, for example. In the imaging device 11, an analog image signal is generated, in accordance with a subject image formed on a light-receiving surface thereof. The analog image signal is A/D-converted to digital image data by an A/D-converter (not shown), and is input to an image processing circuit 12.

The image processing circuit 12 is controlled by a CPU 13. Namely, the image data is temporarily stored in a working memory 14, and is then read out so that the image data is subjected to image processes such as a compression process (JPEG, for example). Raw data, which is not subjected to image processes, and the compressed image data, which is subjected to image processes, can be recorded on a first recording medium (SD card) 15 and a second recording medium (CF card) 16. The raw data and the compressed image data, which are still images, are read from the first and second recording media 15 and 16, so that the still images are displayed on the screen of an LCD monitor 17.

Further, the image data input to the image processing circuit 12 is subjected to image processes, and are then input to the LCD monitor 17, so that the subject is shown as a moving image on the screen of the monitor 17.

For carrying out operations such as a recording operation on the recording media 15 and 16, and an indication operation on the monitor 17, an operation member 18, provided with various kinds of switches, is connected to the image-processing circuit 12.

Figure 2:
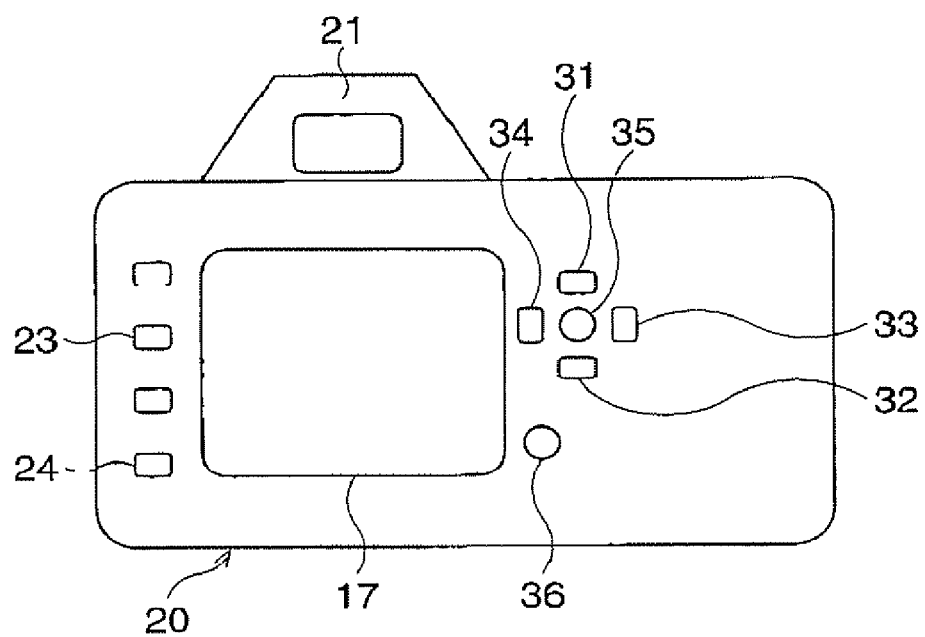
FIG. 2 is a view showing the layout of the rear surface of the digital camera.

FIG. 2 shows the rear surface of the digital camera. A viewfinder 21 is provided on upper surface of the camera body 20. On the rear surface of the camera body 20, the LCD monitor 17 is disposed below the viewfinder 21 in order to display an image or a menu. A deletion button 23 and a reproduction button 24 are arranged to the left side of the LCD monitor 17. By pressing the deletion button 23, image data recorded on the recording media 15 or 16 are deleted. By pressing the reproduction button 24, a still image is reproduced on the screen of the LCD monitor 17, based on image data recorded on the recording media 15 or 16.

An up button 31, a down button 32, a right button 33, a left button 34, a selection button 35, and an execution button 36 are provided to the right side of the LCD monitor 17. The usage of these buttons is described later.

Figures 3, 4:
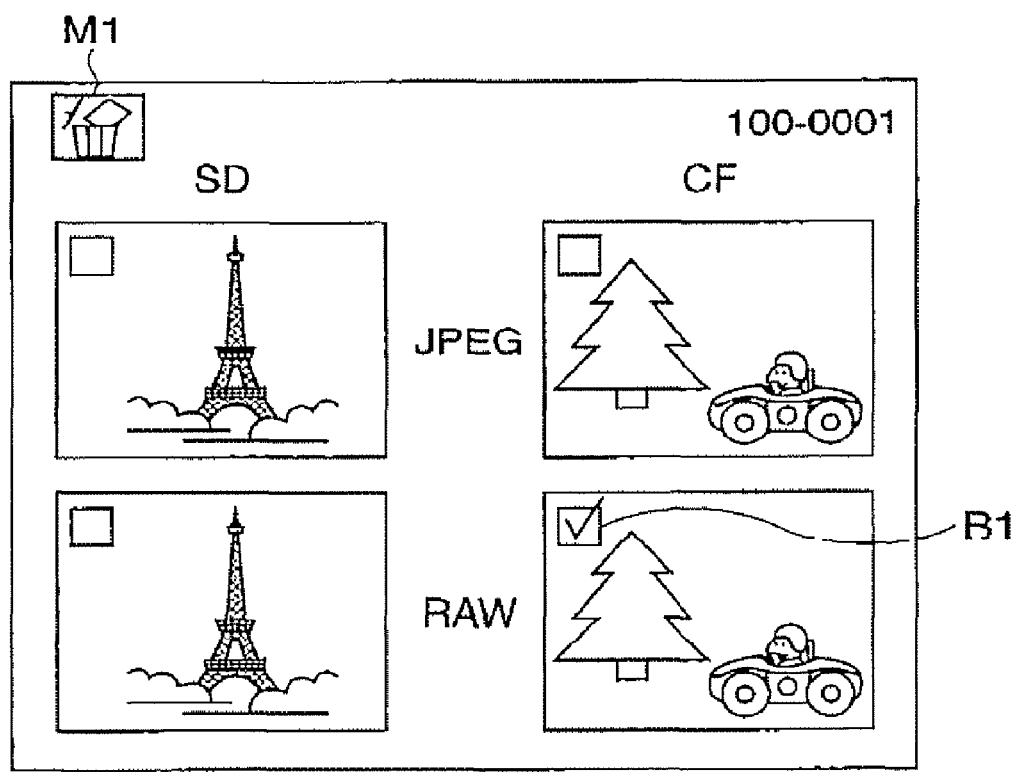
FIG. 3 is a view showing a state, in which different image data are recorded in the same folder-number/file-number pair on an SD card and on a CF card.
FIG. 4 is a view showing an image plane corresponding to FIG. 3.

With reference to FIGS. 3 and 4, an example is described, in which image data, recorded on the first recording medium (SD card) 15 and on the second recording medium (CF card) 16, are displayed in the simultaneous display mode. The recording media 15 and 16 are detachably mounted on the camera body 20, and a common still image is recorded in a recording area, which is specified by a folder-number/file-number pair, in a single photographing operation. The folder-number/file-number pair is formed in a hierarchical structure, in which a large number of file-numbers exist in a stratum below a single folder-number. Namely, a "frame number" or "frame name" corresponding to one image is defined by a folder-number/file-number pair, and a common still image, to which an identical frame number or identical frame name is attached, is recorded on the two recording media 15 and 16, respectively, in a single photographing operation.

Compressed data (JPEG) and raw data (RAW) can be recorded in each of the recording areas of the recording media 15 and 16. FIGS. 3 and 4 show cases in which the compressed data and the raw data are recorded on the recording media 15 and 16. Namely, on the recording media 15 and 16, the compressed data and the raw data are recorded in recording areas, in which the folder-number is "100" and the file-number is "0001". Further, an image (scene A) recorded on the first recording medium (SD card) 15 and an image (scene B) recorded on the second recording medium (CF card) 16 are different. This is a case in which the recording media 15 and 16 are not simultaneously used, but are used separately so that different image data are recorded.

FIG. 4 shows an image plane indicated on the screen of the LCD monitor 17, in which an image is intended to be deleted in the simultaneous display mode, and in the upper-left corner of the screen, an icon M1, indicating that a deletion operation is set at present, is displayed. Further, a check mark is added to a check box B1 located in the upper-left corner of the image corresponding to the raw data recorded on the CF card, indicating that the image data is intended to be deleted.

Figure 5:
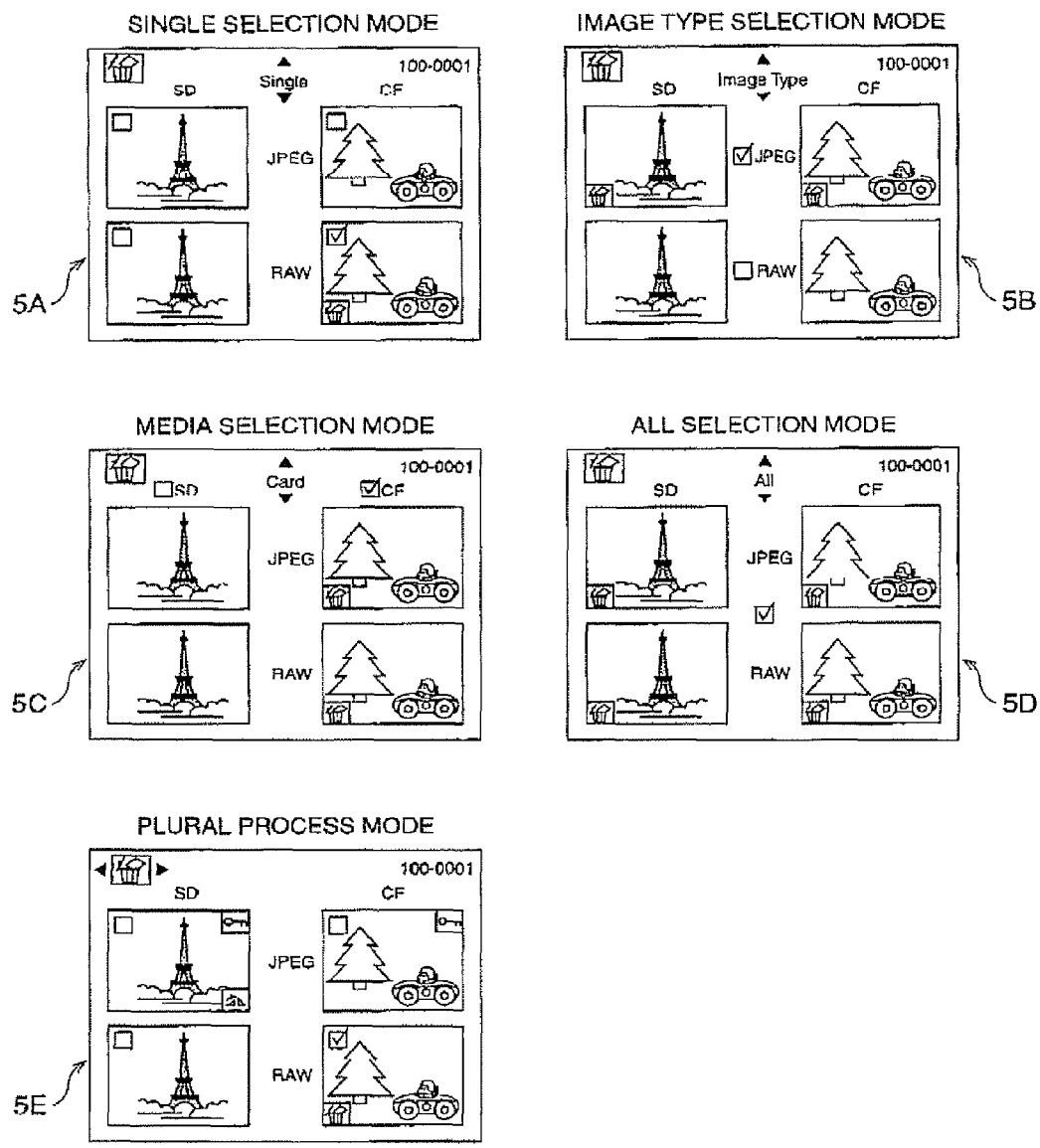
FIG. 5 is a view showing an image plane in which an image data, which is to be deleted in the simultaneous display mode, is selected.

FIG. 5 shows an image plane in which an image data, which is to be deleted in the simultaneous display mode, is selected.

Reference 5A shows a single selection mode, in which an image data of a candidate image, which is to be deleted, is selected one by one. The illustrated example represents a state in which the raw data recorded on the CF card is intended to be deleted.

Reference 5B shows the image type selection mode, in which the image data of a candidate image, which is to be deleted, is selected by designating an image type (or format). The illustrated example represents a state in which the compressed data (image data in JPEG format) are intended to be deleted.

Reference 5C shows the media selection mode, in which the image data, which is to be deleted, is selected by designating the recording medium, and the shown example represents in which the image data recorded on the CF card are intended to be deleted.

Reference 5D shows the all selection mode, in which all of the image data for the images that are displayed on the screen are selected together.

Reference 5E shows the plural process mode, in which a plurality of candidate images are selected such that the candidate images are subjected to different image processes at once. The illustrated example represents a state in which the raw data recorded on the CF card is intended to be deleted, and the compressed data recorded on the SD card and the CF card are protected so that the compressed data is changed to read-only data. Note that, regarding the compressed data on the SD card (i.e., the upper-left image in the image plane of reference 5E), a rotation process (90-degree clockwise rotation, for example) is indicated together with the protection.

It is to be noted that the images corresponding to the compressed image data and the raw data recorded on the CF card are arranged respectively on the right side in each of the image planes indicated by references 5A-5E, and the images corresponding to the compressed image data and the raw data recorded on the SD card are arranged respectively on the left side in each of the image planes indicated by references 5A-5E. Namely, each of the images is indicated in a matrix, in which the images are arranged in a first direction (a horizontal direction) in accordance with the kind of the recording medium, and in which the images are arranged in a second direction (a vertical direction) in accordance with the kind of recording format, in which the images are recorded on the recording medium.

The recording format comprises forms of compressed data and raw data, as in FIG. 5. Namely, the images are recorded in different recording formats on the recording media, and the images are simultaneously displayed in a matrix on the screen, in accordance with the formats, so that the user can easily and visually recognize the states of the images recorded on the recording media.

Figure 6:
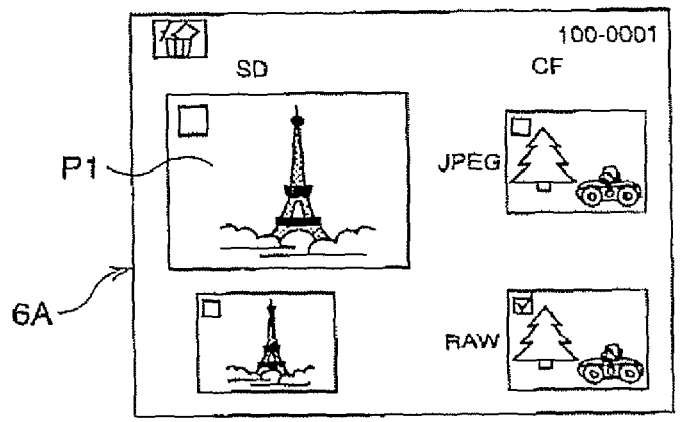
FIG. 6 is a view showing an image plane immediately after the simultaneous display mode has been selected.
Figure 6:
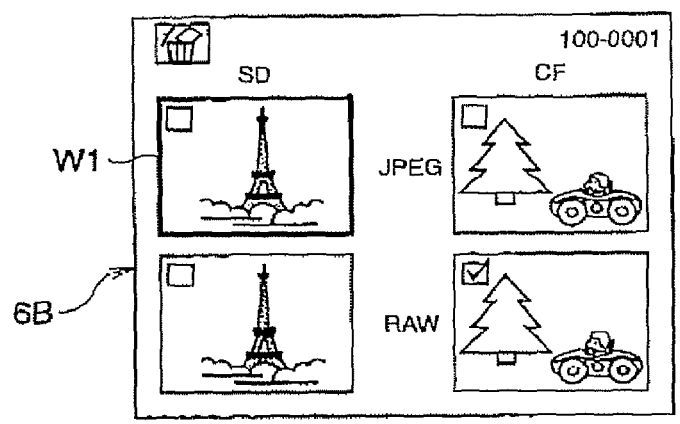
Figure 6:
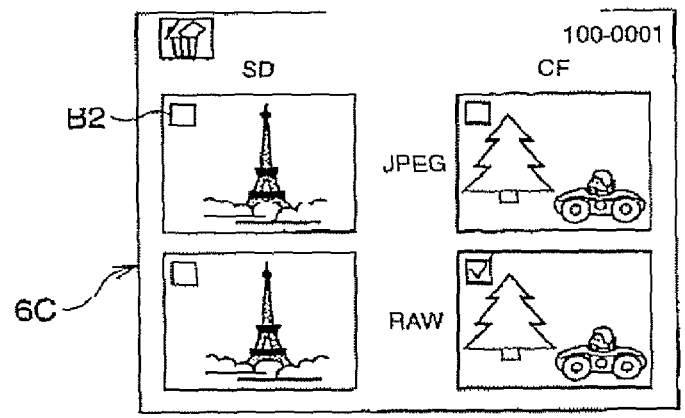

FIG. 6 shows an image plane of the monitor 17 immediately after the simultaneous display mode has been selected. Namely, before the simultaneous display mode is set, the default single image display mode has been set, in which a single image is displayed on the screen of the monitor 17. In the simultaneous display mode, since a plurality of images recorded on the two recording media 15 and 16 are simultaneously displayed, it may not be clear which image has been displayed just before the simultaneous display mode has been set. Therefore, in the embodiment, when switching to the simultaneous display mode, the image plane is indicated in such a manner that a first image, which has been displayed immediately before, can be distinguished from a second image, which is currently displayed.

Reference 6A shows an example in which the image P1, which has been displayed immediately before, is indicated to be larger than the other images. Reference 6B shows an example in which the frame W1 of the image, which has been displayed immediately before, is colored. Reference 6C shows an example in which the checkbox B2 of the image, which has been displayed immediately before, is to be colored.

With reference to FIGS. 7 through 15, operations of the simultaneous display mode are described.

Figure 7:
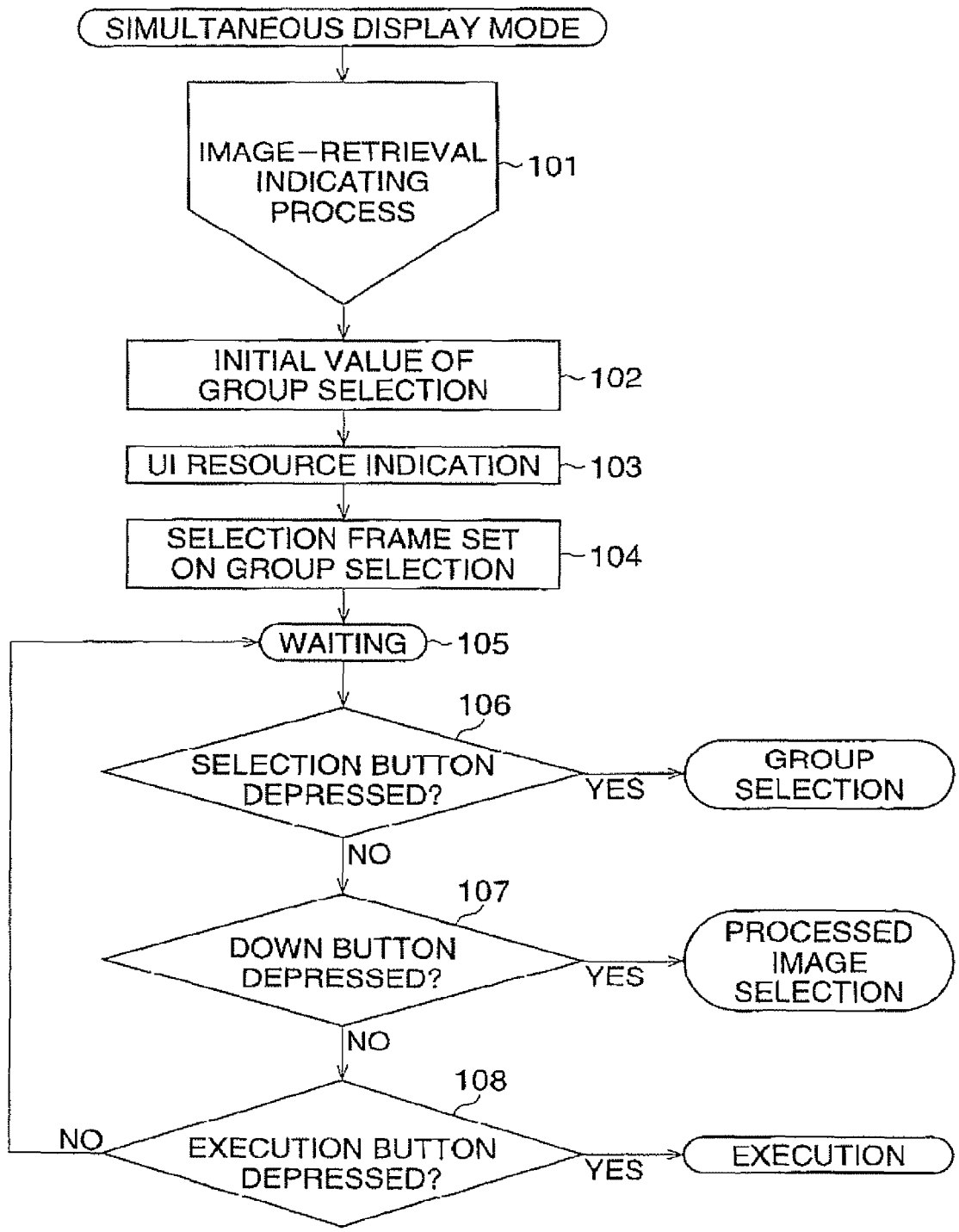
FIG. 7 is a flowchart for the simultaneous display mode.

FIG. 7 shows a flowchart for the simultaneous display mode. In the simultaneous display mode, as shown in FIG. 4, for example, image data recorded on the two recording media 15 and 16, or a plurality of images, are simultaneously displayed, so that a predetermined process (an image process such as deletion, protection, rotation or the like) can perform only for a desired image. Note that, in this embodiment, a case in which a deletion operation is carried out is described as an example.

In Step 101, an image-retrieval-indication is executed. In the image-retrieval-indication process, as described later with reference to FIG. 9, images recorded on the two recording media 15 and 16 are retrieved, so that a plurality of images are displayed in a single image plane. Note that, when the operation of Step 101 is completed, only an image is displayed, and a character, an icon, a check box, an image frame, or so on are not indicated.

In Step 102, the initial value of a group selection is set. Group selection is a mode in which a group of images, for which a process such as a deletion operation is to be performed, is selected. As shown in FIG. 5, there are five modes in the embodiment (references 5A through 5E), and in this specification, the single selection mode and the image type selection mode are described. In the initial set executed in Step 102, the single selection mode, which is the default, is set.

Figure 8:
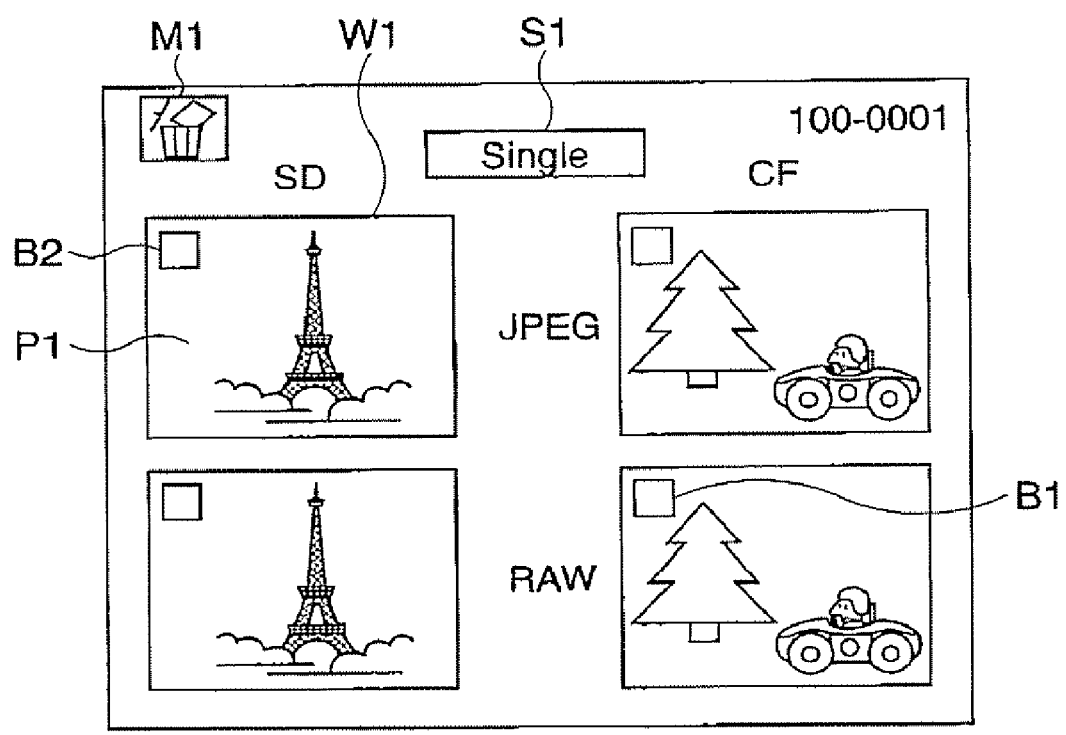
FIG. 8 is a view showing an image plane in the simultaneous display mode.

In Step 103, a user interface (UI) resource indication is carried out. The UI resource is indicated content other than an image PI displayed on the screen of the monitor 17; i.e., the icon M1, the characters, the check boxes B1 and B2, the image frame W1, and so on. In Step 104, characters indicating the mode of the group selection are enclosed by a selection frame S1, on the screen of the monitor 17. Due to the execution of Steps 103 and 104, the screen of the monitor 17 is changed to a state in which the image P1, the icon M1, and so on are displayed, as shown in FIG. 8.

In Step 105, a waiting state is set. In this state, when any one of the up button 31, the down button 32, the right button 33, the left button 34, the selection button 35, or the execution button 36 is depressed, the process proceeds to Step 106. It is then determined in Step 106 whether the selection button 35 is depressed, and if the selection button 35 is depressed, a subroutine for group selection (FIG. 10) is executed. If it is judged that the selection button 35 is not depressed, the process proceeds to Step 107, in which it is determined whether the down button 32 is depressed. If the down button 32 is depressed, a subroutine for processed image selection (FIG. 12 or 14) is executed. If it is judged that the down button 32 is not depressed, the process proceeds to Step 108, in which it is determined whether the execution button 36 is depressed. If the execution button 36 is depressed, the operation which is set at present is executed. If it is judged that the execution button 36 is not depressed, the process returns to Step 105.

Figure 9:
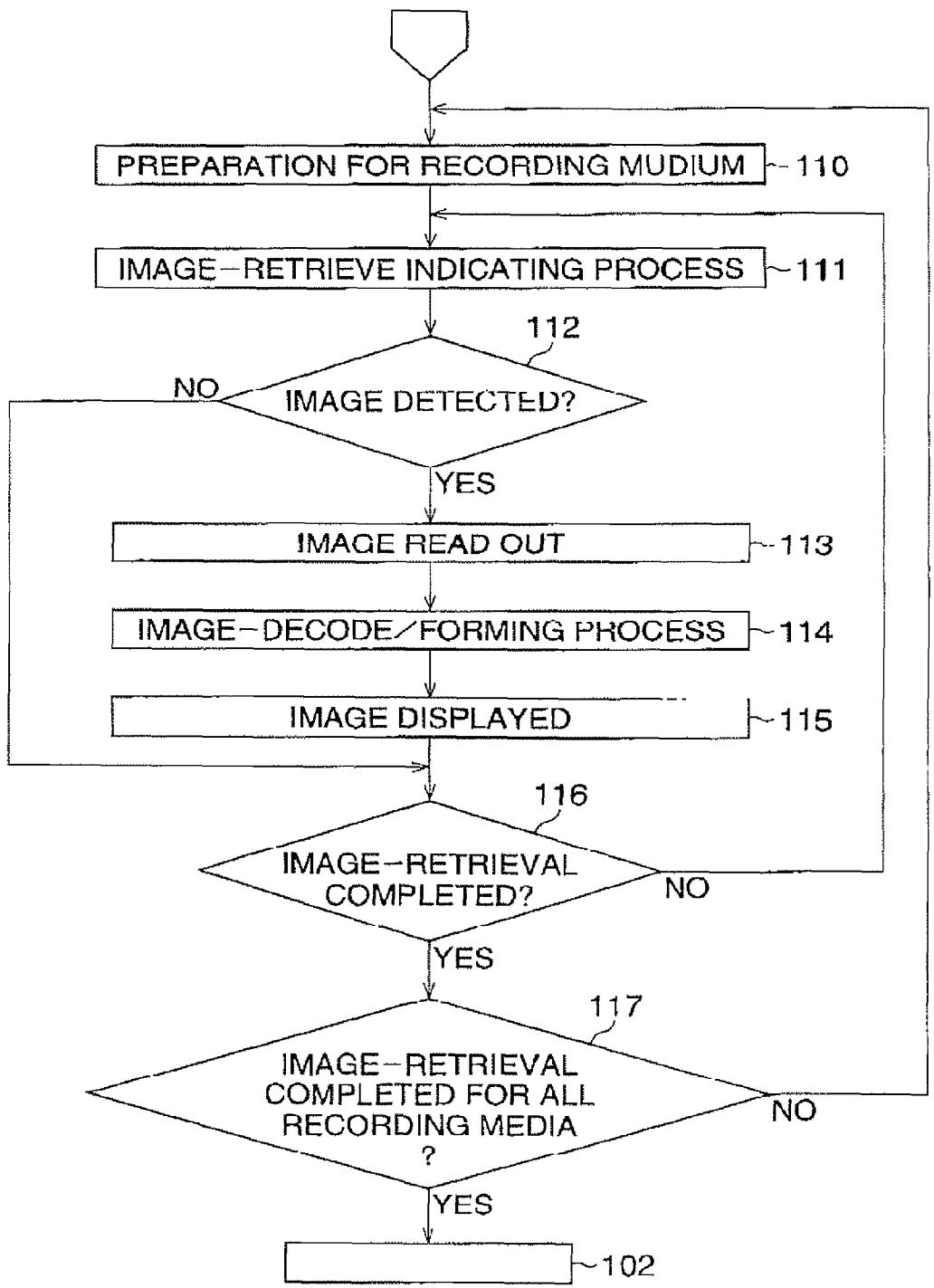
FIG. 9 is a flowchart for an image-retrieval-indication process.

FIG. 9 shows a flowchart for the image-retrieval-indication process executed in Step 101 of FIG. 7. In Step 110, preparation of the recording medium, or initialization of the file system for the recording medium, is carried out, so that the image data recorded on the recording medium becomes readable.

In Step 111, the image-retrieval-indication process is executed. Prior to the image-retrieval-indication process, a folder-number/file-number pair (i.e., a frame number) has been highlighted using the up button 31, the down button 32, or so on, so that the image data corresponding to the frame number is retrieved in Step 111. In Step 112, it is determined whether the image data corresponding to the frame number has been detected. If the image data has been detected, the process proceeds to Step 113, in which the image data is read out from the recording medium. In Step 114, an image-decoding/forming process is carried out for the image data, which is a process for indicating an image in a predetermined area in an image plane on the monitor 17. In Step 115, the image is displayed according to the execution result of Step 114, so that the image corresponding to the image data read out in Step 113 is displayed on the screen of the monitor 17.

In Step 116, it is determined whether image-retrieval has been completed. Image-retrieval is carried out until all the image data in the matching folder-number/file-number pair have been detected. For example, as shown in FIG. 6, when compressed image data and raw data are recorded to the same folder-number/file-number pair, image-retrieval is carried out twice. For example, if the compressed image data is read out first, the process returns from Step 116 to Step 111, and the loop composed of Steps 111 through 116 is executed again, this time for the raw data, so that the image corresponding to the raw data is displayed.

When it is judged in Step 116 that image-retrieval has been completed, Step 117 is executed, in which it is determined whether image-retrieval has been completed for all the recording media. When two recording media are mounted, and Step 117 is executed for the first time, since the image-retrieval has been completed only for one recording medium, the process returns to Step 110. Namely, regarding the other recording media, Step 110 and the following steps are executed, so that the images corresponding to the compressed image data and the raw data are displayed.

Figure 10:
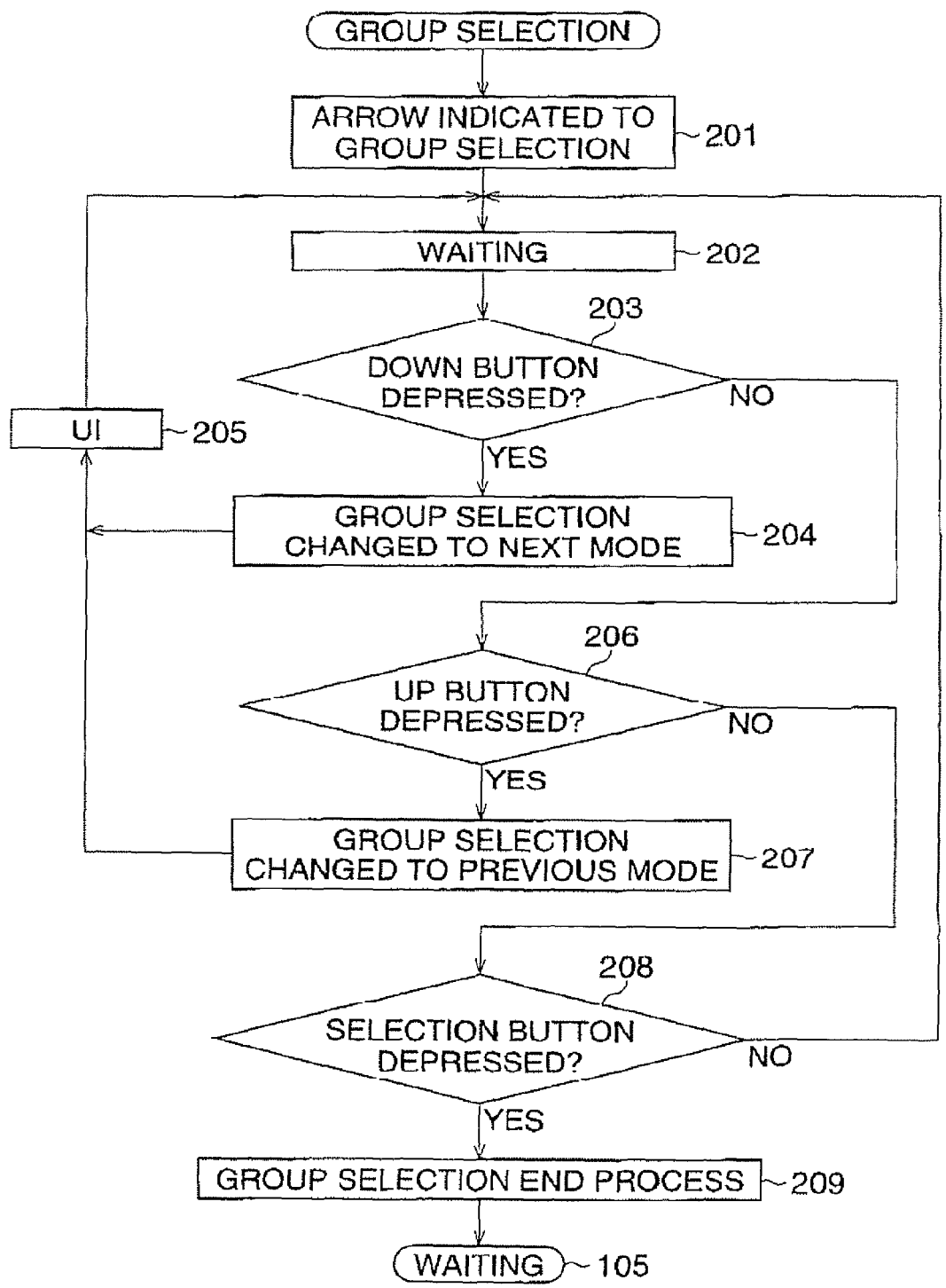
FIG. 10 is a flowchart for a subroutine for the group selection.
Figure 11:
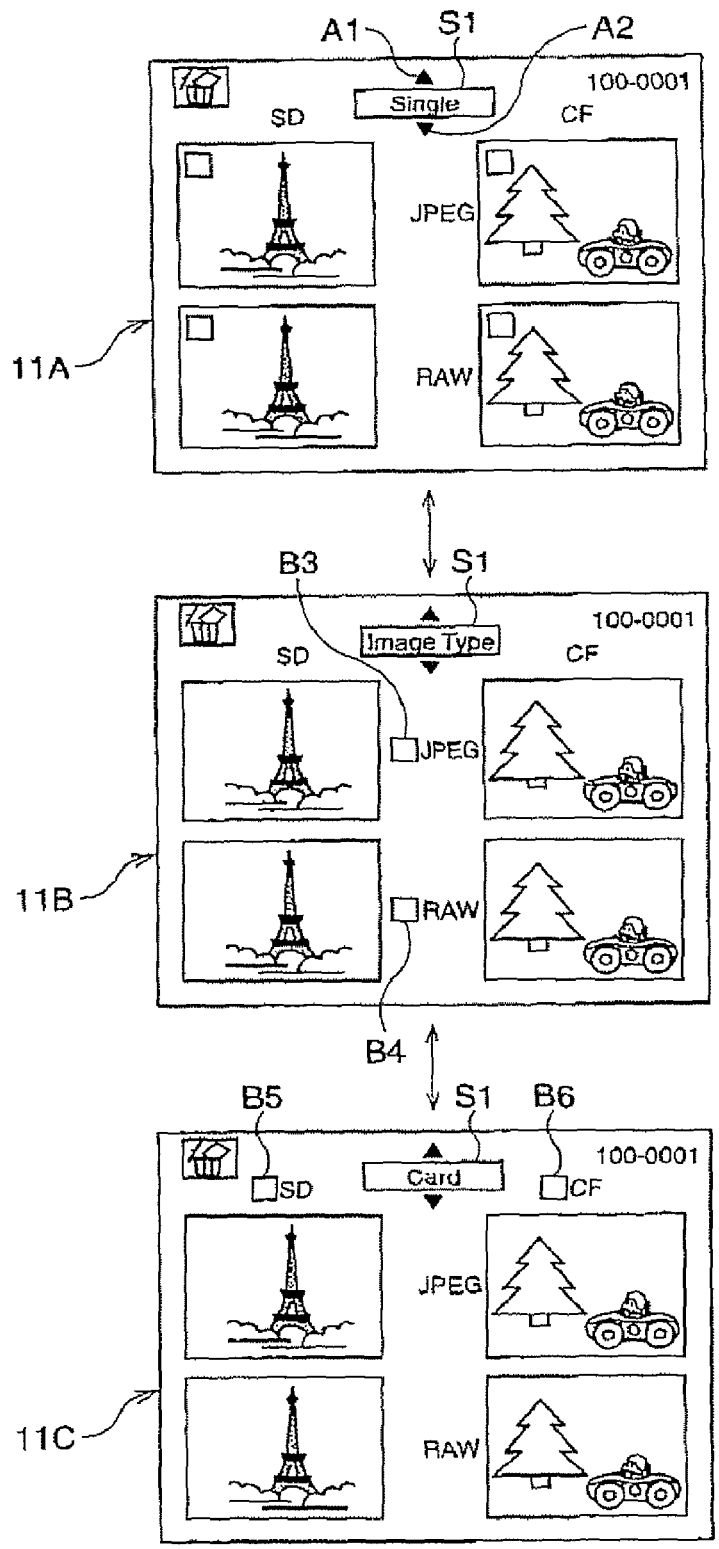
FIG. 11 is a view showing an image plane displayed by the monitor in the group selection.

FIG. 10 shows a flowchart for a subroutine for group selection, which is executed when it is judged in Step 106 of FIG. 7 that the selection button 35 is depressed. FIG. 11 shows an image plane displayed on the monitor 17 in the group selection.

In Step 201, arrows are displayed above and below the characters for the mode of the group selection on the screen of the monitor 17. As described above, due to the execution of Step 102 of FIG. 7, the single selection mode, which is the default, has been set, and the characters "Single", indicating the single selection mode, have been displayed on an upper portion of the image plane, and due to the execution of Step 104, the characters "Single" are enclosed by the selection frame S1. Thus, in Step 201, the arrows A1 and A2 are indicated above and below, respectively, the characters "Single" (see FIG. 11, reference 11A).

In Step 202, the selection operation is set to a waiting state. In this state, when any one of the up button 31, the down button 32, or the selection button 35 is depressed, the process proceeds to Step 203, in which it is determined whether the down button 32 is depressed. If the down button 32 is depressed, Step 204 is executed, in which the group selection is changed to the next mode. In this embodiment, the control is designed in such a manner that the image type selection mode can be selected after the single selection mode. Namely, in Step 204, the image type selection mode is set, so that a UI (user interface) resource corresponding to the image type selection mode is carried out in Step 205. Thus, in a similar way as in Step 103 of FIG. 7, the UI resource corresponding to the image type selection mode is displayed. Due to this, the image plane of the monitor 17 is set to the state shown by reference 11B. Namely, the inside of the selection frame S1 is changed to the characters "Image Type", indicating the image type selection mode, and check boxes B3 and B4, corresponding to the image type selection mode, are displayed.

After the execution of Step 205, the process returns to Step 202, in which the operations described above are executed again. Here, if the down button 32 is depressed, in Step 204, the mode is changed from the image type selection mode to the media selection mode. Then, due to the execution of Step 205, the image plane of the monitor 17 is set to the state illustrated by reference 11C, in which the inside of the selection frame S1 is changed to the characters "Card", indicating the media selection mode, and check boxes B5 and B6, corresponding to the media selection mode, are displayed.

Conversely, if it is judged in Step 203 that the down button 32 is not depressed, the process proceeds to Step 206, in which it is determined whether the up button 31 is depressed. If the up button 31 is depressed, Step 207 is executed, in which the mode is set to the previous mode. For example, when the image type selection mode is set, the mode is changed to the single selection mode, so that a UI resource corresponding to the single selection mode is displayed on the image plane of the monitor 17 in Step 205. Namely, the image plane is changed from the state shown by reference 11B to the state shown by reference 11A.

If it is judged in Step 206 that the up button 31 is not depressed, the process proceeds to Step 206, in which it is determined whether the selection button 35 is depressed. If the selection button 35 is depressed, Step 209 is executed, in which the mode of the group selection, which is set at this time, is considered the mode in which the image process is performed. Due to this, execution of the subroutine for the group selection is set to a waiting state, which is the same as in Step 105 of FIG. 7. Conversely, if it is judged in Step 208 that the selection button 35 is not depressed, the process returns to Step 202, so that the operations described above from Step 202 to Step 208, are executed.

If the mode of the group selection is decided, and a waiting state is set, then if the down button 32 is depressed, the waiting state is cancelled, so that the operations proceed in the order of Steps 105, 106, and 107, as in FIG. 7. Thus, the subroutine for processed image selection is executed.

Figure 12:
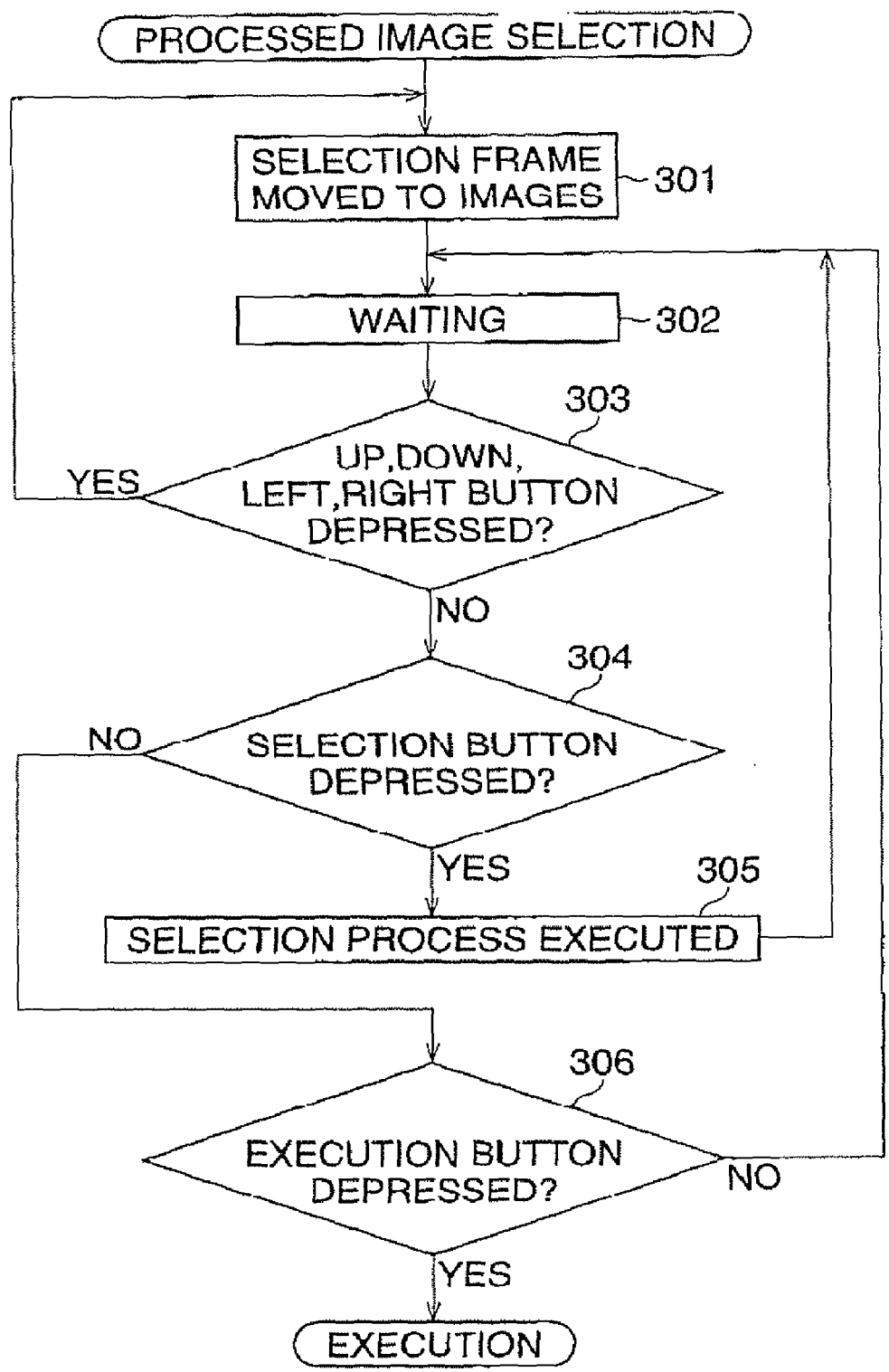
FIG. 12 is a flowchart for a subroutine for processed image selection, executed in the single selection mode.
Figure 13:
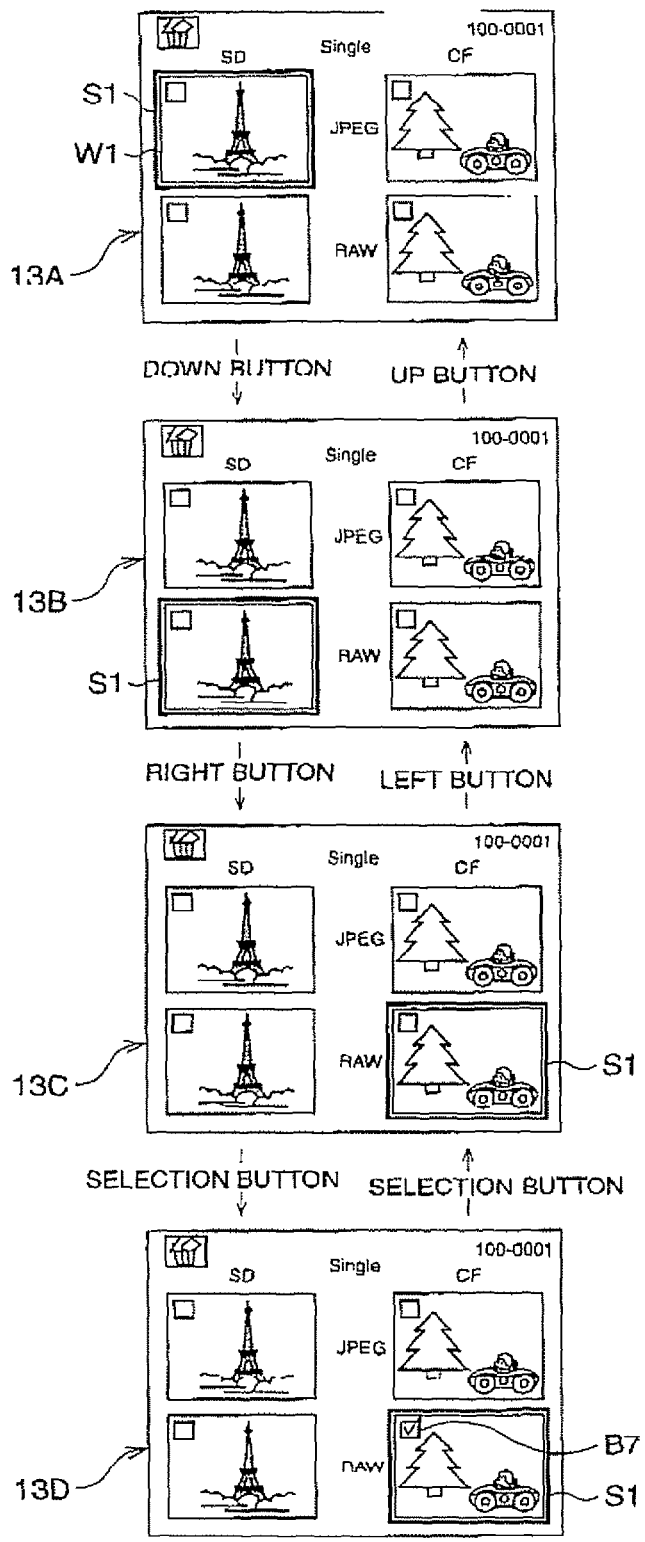
FIG. 13 is a view showing an image plane displayed by the monitor when executing processed image selection in the single selection mode.

FIG. 12 shows a flowchart for a subroutine for processed image selection, which is executed if it is judged in Step 107 of FIG. 7 that the down button 32 is depressed when the single selection mode is set. FIG. 13 shows an image plane displayed by the monitor 17 when processed image selection is executed in the single selection mode.

In Step 301, in accordance with the depression of the down button 32, the selection frame S1, displayed on the image plane, is changed from a state enclosing the characters indicating the mode of group selection to a state enclosing an image frame. In this embodiment, first, the selection frame S1 is changed to enclose the image frame W1 of an image corresponding to a compressed image data recorded on the SD card (reference 13A). In Step 302, the selection operation is set to a waiting state.

If any one of the up button 31, the down button 32, or so on is depressed, the process proceeds to Step 303. If it is judged in Step 303 that any one of the up button 31, the down button 32, the right button 33, or the left button 34 is depressed, the process returns to Step 301, so that the selection frame S1 is moved in a direction corresponding to the depressed button. For example, if the down button 32 is depressed in a state illustrated by reference 13A, the selection frame S1 is changed to the position of an image corresponding to the raw data of the SD card, as illustrated in reference 13B. In this state, if the right button 33 is depressed, the selection frame S1 is changed to the position of an image corresponding to the raw data of the CF card, as illustrated in reference 13C.

Thus, if any image is highlighted and the selection button 35 is depressed, the operations proceed in the order of Steps 303, 304, and 305. Namely, in Step 305, the selection process is executed, so that the image that is highlighted at this time is selected as an image to be image-processed. In the check box for the selected image, a check mark is added, as indicated by reference 13D. After the execution of Step 305, the process returns to Step 302, so that the process waits until any one of the up button 31, the down button 32, or so on is depressed.

In this state, if any one of the up button 31, the down button 32, or so on is depressed, Step 301 or Step 305 is again executed in accordance with the depressed button, and if the execution button 36 is depressed, the operations proceed in the order of Steps 303, 304, and 306, in which a predetermined process is executed. Conversely, if a button other than the up button 31, the down button 32, the right button 33, the left button 34, the selection button 35, or the execution button 36 is depressed, the process returns to Step 302.

If it is judged in Step 306 of FIG. 12 or Step 108 of FIG. 7 that the execution button 36 is depressed, the image process, which is set at that time, is executed. In this embodiment, a deletion operation of an image is carried out. For example, if the execution button 36 is depressed in the state indicated by reference 13D, the marked raw data recorded on the CF card is deleted.

Figure 14:
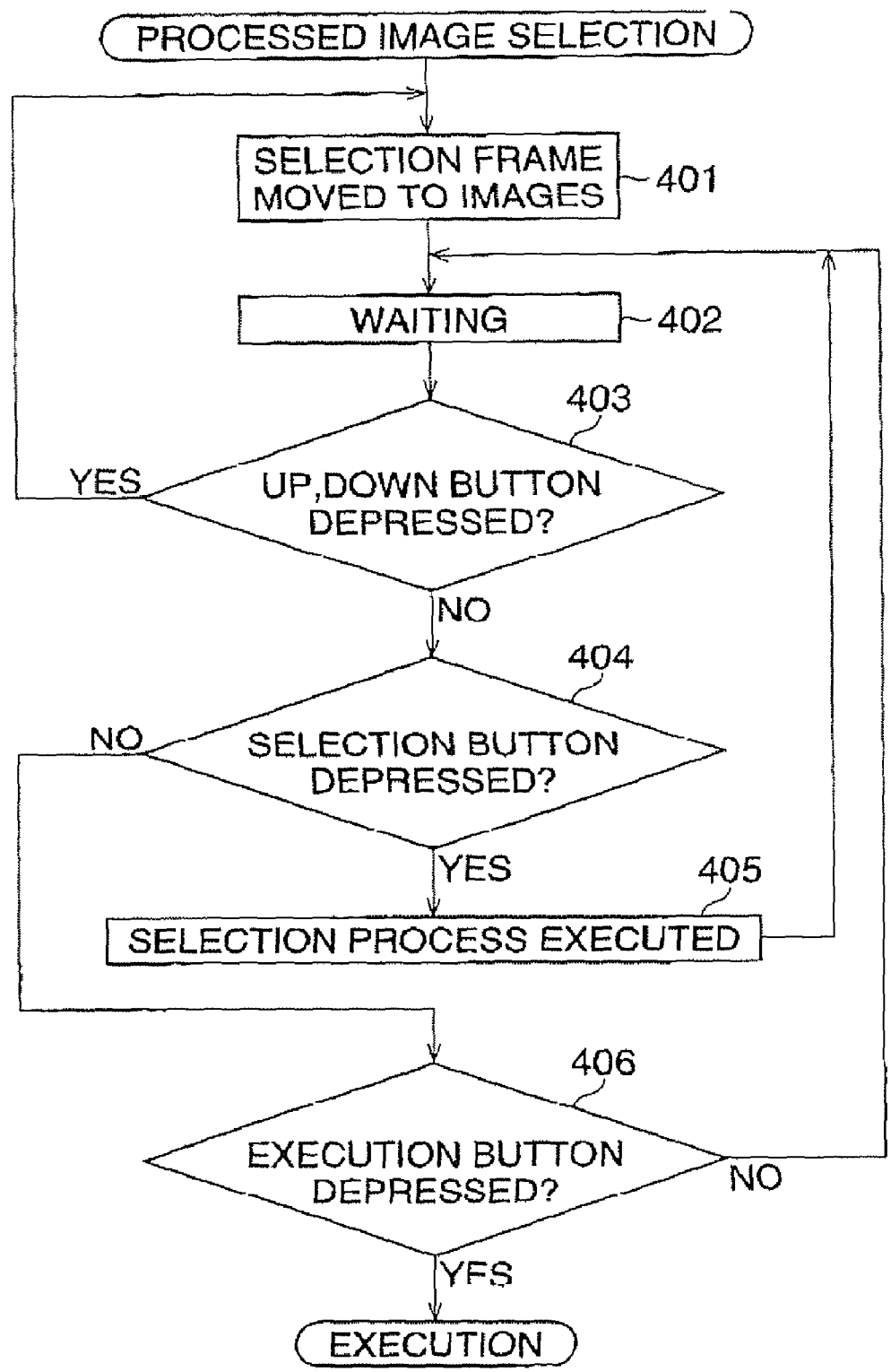
FIG. 14 is a flowchart for a subroutine for the processed image selection, executed in the image type selection mode.
Figure 15:
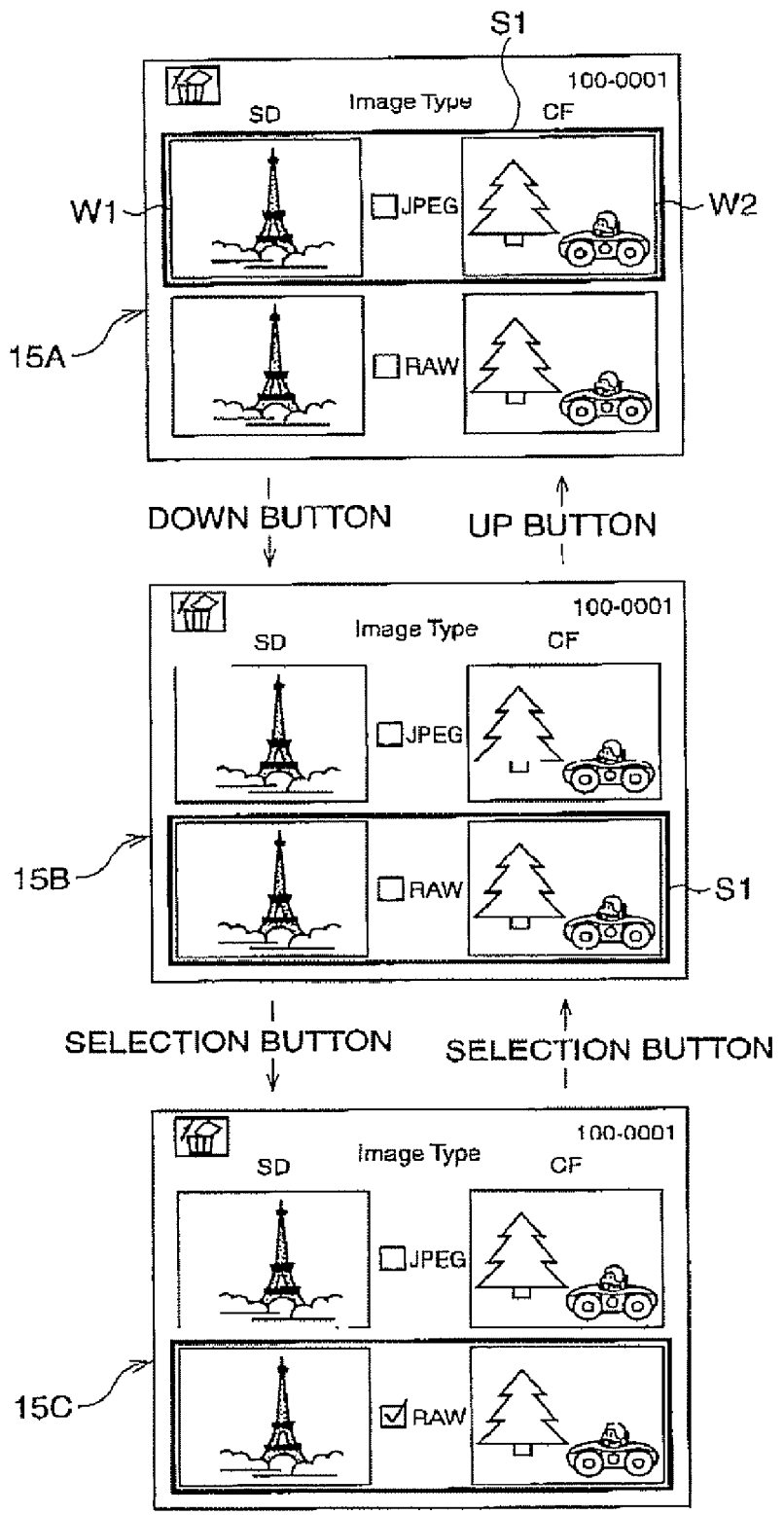
FIG. 15 is an image plane displayed by the monitor when executing processed image selection in the image type selection mode.

FIG. 14 shows a flowchart for a subroutine for processed image selection, which is executed if it is judged in Step 107 of FIG. 7 that the down button 32 is depressed when the image type selection mode is set. FIG. 15 shows an image plane displayed on the monitor 17 when processed image selection is executed in the image type selection mode.

In Step 401, in accordance with the depression of the down button 32, the selection frame S1, indicated on the image plane, is changed from a state enclosing the characters, indicating the mode of group selection, to a state enclosing an image frame. In this embodiment, first, the selection frame S1 is changed to enclose the image frames W1 and W2 of two images corresponding to compressed image data recorded on the SD card and on the CF card (reference 15A). In Step 402, the selection operation is set to a waiting state.

If any one of the up button 31, the down button 32, or so on is depressed, the process proceeds to Step 403. If it is judged in Step 403 that either the up button 31 or the down button 32 is depressed, the process returns to Step 401, so that the selection frame S1 is moved in a direction corresponding to the depressed button. For example, if the down button 32 is depressed in a state indicated by reference 15A, the selection frame S1 is changed to the position of two images corresponding to the raw data of the SD card and the CF card, as illustrated by reference 15B.

Thus, if any image is highlighted and the selection button 35 is depressed, the operations proceed in the order of Steps 403, 404, and 405. Namely, in Step 405, the selection process is executed, so that the images that are highlighted at this time, are selected as images to be image-processed. In the check box indicated for the two selected images, a check mark is added, as illustrated by reference 15C. After the execution of Step 405, the process returns to Step 402, so that the process waits until any one of the up button 31, the down button 32, or so on is depressed.

In this state, if any one of the up button 31, the down button 32, or so on is depressed, Step 401 or Step 405 is again executed in accordance with the depressed button, and if the execution button 36 is depressed, the operations proceed in the order of Steps 403, 404, and 406, in which a predetermined process (a deletion operation, in this embodiment) is executed. Conversely, if a button other than the up button 31, the down button 32, the selection button 35, or the execution button 36 is depressed, the process returns to Step 402.

If it is judged in Step 406 of FIG. 14 that the execution button 36 is depressed, the deletion operation is executed. For example, if the execution button 36 is depressed in the state indicated by reference 15C, the raw data recorded on the SD card and the CF card are simultaneously deleted.

As described above, according to the embodiment, before an image process such as a deletion operation is performed for a plurality of images recorded on the first and second recording media 15 and 16, the contents of these images can be confirmed, so that the execution of an erroneous image process can be prevented.

Note that the embodiment described above is of a digital camera, which records a common still image on the two recording media 15 and 16, which are detachably mounted on the camera. However, the present invention is not limited to such a construction, but can be applied to an image-recording device, which can record an identical image both in an internal memory provided in a digital camera and on a recording medium detachably mounted on the digital camera. Further, the present invention can be applied to an image-recording device, which can record an identical image data in a plurality of recording areas in the internal memory.

Further, in the present invention, image processes for images recorded on two recording media are not limited to deletion operations, but may be protection processes (i.e., modes for changing to read-only media), and may include all image processes, usually performed, including processes for moving an image, such as rotation.

Furthermore, the number of recording media, in which common images are recorded, is not limited to two, but may be greater than two.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2005-158978 (filed on May 31, 2005) which is expressly incorporated herein, by reference, in its entirety.

The invention claimed is:

1. An image-recording device comprising:
   a recording processor that records a same still image, to which an identical frame number or identical frame name is attached, in a plurality of recording media, respectively, which are detachably mounted on said image-recording device;
   a monitor that displays at least one still image on a screen of the monitor;
   an image-indicating processor that simultaneously displays a plurality of images, which are read from said plurality of recording media, with said attached identical frame number or said attached identical frame name, on said screen, the plurality of images corresponding to the same still image; and
   an image-selecting processor that selects a candidate image, to be subjected to a predetermined image process, from said plurality of images indicated by said image-indicating processor,
   wherein said image-indicating processor displays said plurality of images, on said screen, in a matrix in which said plurality of images are arranged in a single line extending in a first direction in accordance with a type of said recording media, and said plurality of images are arranged in a single line extending in a second direction, different than the first direction, in accordance with a kind of recording format, in which said plurality of images are recorded in said recording media, said images of each kind of recording format and said images of each type of recording media being arranged in only a single line extending in a respective one of said first and second directions and
   wherein said image selecting processor, in a first mode in which the plurality of images are arranged in the first direction, displays a plurality of check boxes arranged in the first direction, and in a second mode in which the plurality of images are arranged in the second direction, displays a plurality of check boxes arranged in the second direction.

2. The image-recording device according to claim 1, wherein said recording processor can record images in different recording formats on said plurality of recording media, and said image-indicating processor simultaneously indicates that said still images recorded are in said different recording formats on the screen.

3. The image-recording device according to claim 2, wherein said different recording formats comprise a raw data and a compressed data.

4. The image-recording device according to claim 1, wherein said image-selecting processor selects said candidate image one by one.

5. The image recording device according to claim 1, wherein said image-selecting processor selects said candidate image by designating said recording medium.

6. The image-recording device according to claim 2, wherein said image-selecting processor selects said candidate image by designating said format.

7. The image-recording device according to claim 1, wherein said image-selecting processor selects all the images displayed on said screen as said candidate image.

8. The image-recording device according to claim 1, wherein said image-selecting processor selects a plurality of said candidate images such that said candidate images are subjected to different image processes.

9. The image-recording device according to claim 1, wherein said image-indicating processor simultaneously displays a first image, which has been displayed immediately previously, and a second image, in such a manner that said first image is distinguishable from said second image.

10. An image-recording device comprising:
    a recording processor that records a same still image, to which an identical frame number or identical frame name is attached, in an internal memory and on a recording medium, respectively, which is detachably mounted to said image-recording device;
    a monitor that displays at least one still image on a screen of the monitor;
    an image-indicating processor that simultaneously displays a plurality of images, which are read from said internal memory and said recording medium, with said attached identical frame number or said attached identical frame name, on said screen, the plurality of images corresponding to the same still image; and an image-selecting processor that selects a candidate image, which is to be subjected to a predetermined image process, from said plurality of images indicated by said image-indicating processor;

wherein said image-indicating processor displays said plurality of images, on said screen, in a matrix in which said plurality of images are arranged in a single line extending in a first direction in accordance with a type of said recording media, and said plurality of images are arranged in a single line extending in a second direction, different than the first direction, in accordance with a kind of recording format, in which said plurality of images are recorded in said recording media, said images of each kind of recording format and said images of each type of recording media being arranged in only a single line extending in a respective one of said first and second directions and wherein said image selecting processor, in a first mode in which the plurality of images are arranged in the first direction, displays a plurality of check boxes arranged in the first direction, and in a second mode in which the plurality of images are arranged in the second direction, displays a plurality of check boxes arranged in the second direction.

11. An image-recording device comprising:

a recording processor that records a same still image, to which an identical frame number or identical frame name is attached, in a plurality of recording areas provided in an internal memory, respectively;

a monitor that indicates at least one still image on a screen of the monitor;

an image-indicating processor that simultaneously indicates a plurality of images, which are read from said plurality of recording areas, with said attached identical frame number or said attached identical frame name, on said screen, the plurality of images corresponding to the same still image; and an image-selecting processor that selects a candidate image, to be subjected to a predetermined image process, from said plurality of images indicated by said image-indicating processor;

wherein said image-indicating processor displays said plurality of images, on said screen, in a matrix in which said plurality of images are arranged in a single line extending in a first direction in accordance with a recording area of the plurality of recording areas, and said plurality of images are arranged in a single line extending in a second direction, different than the first direction, in accordance with a kind of recording format, in which said plurality of images are recorded in the recording areas, said images of each kind of recording format and said images of each type of recording area being arranged in only a single line extending in a respective one of said first and second directions and said image selecting processor, in a first mode in which the plurality of images are arranged in the first direction, displays a plurality of check boxes arranged in the first direction, and in a second mode in which the plurality of images are arranged in the second direction, displays a plurality of check boxes arranged in the second direction.

12. The image recording device according to claim 1, wherein said image selecting processor is selectively operable to select said candidate image one by one, to select said candidate image by designating the recording medium, to select said candidate image by designating a format of the recorded image or to select said candidate image by designating all the images displayed on the screen.

13. The image recording device according to claim 10, wherein said image selecting processor is selectively operable to select said candidate image one by one, to select said candidate image by designating the recording medium, to select said candidate image by designating a format of the recorded image or to select said candidate image by designating all the images displayed on the screen.

14. The image recording device according to claim 11, wherein said image selecting processor is selectively operable to select said candidate image one by one, to select said candidate image by designating the recording area, to select said candidate image by designating a format of the recorded image, or to select said candidate image by designating all the images displayed on the screen.

15. The image recording device according to claim 10, wherein said image selecting processor selects a plurality of said candidate images such that said candidate images are subjected to different image processes.

16. The image recording device according to claim 11, wherein said image selecting processor selects a plurality of said candidate images such that said candidate images are subjected to different image processes.

17. The image recording device according to claim 10, wherein said image indicating processor simultaneously displays a first image, which has been displayed immediately previously, and a second image, in such a manner that the first image is distinguishable from the second image.

18. The image recording device according to claim 11, wherein said image indicating processor simultaneously displays a first image, which has been displayed immediately previously, and a second image, in such a manner that the first image is distinguishable from the second image.

19. The image recording device according to claim 1, said type of recording media comprising at least two different types of recording media, and said kind of recording format comprising at least two different kinds of recording formats.

* * * * *